United States Patent [19]

Pitiot

[11] Patent Number: 6,108,424
[45] Date of Patent: Aug. 22, 2000

[54] MOBILE RADIO TELEPHONE STATION COMPRISING A PROTECTION SYSTEM FOR AT LEAST ONE AUTHENTICATION NUMBER AND METHOD OF PROTECTING AN AUTHENTICATION NUMBER

[75] Inventor: Yann Pitiot, Le Mans, France

[73] Assignee: U.S. Philips Corporation, New York, N.Y.

[21] Appl. No.: 09/003,041

[22] Filed: Jan. 5, 1998

[30] Foreign Application Priority Data

Jan. 9, 1997 [FR] France ................................... 97 00153

[51] Int. Cl.[7] .......................................................... H04L 9/00
[52] U.S. Cl. ........................... 380/270; 380/272; 380/273; 380/277; 380/281; 380/284; 455/410; 455/435; 455/551
[58] Field of Search ................................ 380/23, 30, 247, 380/248, 249, 259, 260, 264, 270, 273, 43, 278, 277, 284, 285; 455/410, 435, 551; 370/331, 350

[56] References Cited

U.S. PATENT DOCUMENTS

| | | | |
|---|---|---|---|
| 5,144,667 | 9/1992 | Pugue, Jr. et al. ........................ | 380/45 |
| 5,204,902 | 4/1993 | Reeds, III et al. ........................ | 380/23 |
| 5,239,294 | 8/1993 | Flanders et al. ................... | 340/825.34 |
| 5,377,267 | 12/1994 | Suzuki et al. .............................. | 380/23 |
| 5,384,847 | 1/1995 | Hendrickson et al. .................... | 380/23 |
| 5,392,356 | 2/1995 | Konno et al. .............................. | 380/23 |
| 5,467,398 | 11/1995 | Pierce et al. .............................. | 380/44 |
| 5,689,563 | 11/1997 | Brown et al. .............................. | 380/23 |
| 5,793,866 | 8/1998 | Brown et al. ............................... | 380/2 |
| 5,794,139 | 8/1998 | Mizikovsky et al. ................... | 455/403 |
| 5,850,444 | 12/1998 | Rune ......................................... | 380/21 |
| 5,883,960 | 3/1999 | Maruyama et al. ....................... | 380/23 |

OTHER PUBLICATIONS

EIA/TIA (Electronics Industry Association/Telecommunications Industry Association) Interim Standard IS–54, Revisiono B, Apr. 1992, pp. 81–88.

Primary Examiner—Tod R. Swann
Assistant Examiner—Paul E. Callahan
Attorney, Agent, or Firm—Dicran Halajian

[57] ABSTRACT

The mobile station comprises Traffic Identification Encryption means (TIE) and a memory (54) for storing at least one authentication number (A-key). According to the invention, the protection system comprises a program (61) for encrypting during operation the A-key by the TIE means, and for storing (A1) the encrypted A key, and a program (62) for decrypting, according to the TIE means, the A-key when its non-coded use is needed in the mobile station.

12 Claims, 2 Drawing Sheets

MOBILE RADIO TELEPHONE STATION COMPRISING A PROTECTION SYSTEM FOR AT LEAST ONE AUTHENTICATION NUMBER AND METHOD OF PROTECTING AN AUTHENTICATION NUMBER

BACKGROUND OF THE INVENTION

The invention relates to a mobile radio telephone station comprising traffic and identification encryption means, a protection system for at least one authentication number, and storage means for storing said authentication number.

The invention likewise relates to a method of protecting an authentication number contained in a mobile radio telephone station of the type mentioned above.

Such a protection finds interesting applications notably in the field of mobile radio telephony of the AMPS type (or TACS and ETACS) and also of the CDMA type. Important numbers in this field are, notably, the identification numbers (ESN and MIN) of the telephony devices which can be connected to the AMPS network, numbers which correspond to the serial number of the telephony device and to the latter's identification number, respectively. These numbers are the prey of pirates who try to appropriate a code that does not belong to them, so that the communications are charged to another person than themselves.

In order to protect oneself against this type of dishonest manoeuvres, a protection system is known which is described in the opening paragraph of U.S. Pat. No. 5,392,356. According to this known system, the identification code(s) is (are) encrypted in the mobile station before being written in the EEPROM of the mobile station, after which the codes are then decrypted and transmitted the moment the communication is sent. Such a trick prevents the identification codes from being extracted from the EEPROM by hardware means and thus from being acquired in a simple manner.

However, identification codes such as the MIN and ESN can always be acquired by an interception of a communication between the mobile station and the base station, which makes aforesaid fraud still possible.

For maintaining the integrity of the mobile stations and precluding their being pirated, one has gradually been led to introduce more sophisticated authentication procedures as the pirating of mobile stations increased. From now on, in many networks an authentication number is assigned to each mobile station; this is the authentication key or A-key, and a second authentication number, the SSD (Shared Secret Data) is computed by encryption based on the A-key.

OBJECTS AND SUMMARY OF THE INVENTION

It is an object of the present invention to preclude the reading of authentication key(s) contained in a mobile radio telephone station by electronic means.

It is a further object of the invention to provide a mobile radio telephone station of which the illegal use is precluded.

These objects are achieved and the drawbacks of the prior art are mitigated by the fact that the mobile radio telephone station defined in the opening paragraph is characterized in that said protection system comprises encryption means for encrypting, when the mobile station is put into operation, said authentication number shown in non-coded form, by said traffic and identification encryption means, and for storing the authentication number only in its encrypted form in said storage means, and for decrypting said authentication number with said traffic and identification encryption means when its non-coded use is needed in the mobile station.

Thus, a person having wrong intentions who would happen to read the contents of the EEPROM of a thus protected mobile unit and isolate the authentication keys such as the A-key and the SSD in coded form, would not be capable of decoding these keys to introduce them illegally in non-coded form in a conventional mobile station. Furthermore, the authentication keys are only used for encryption and cannot be transmitted by radio, which completely prevents a third party other than the manufacturer, or the operator and possibly the subscriber, from having access thereto.

It will also be noted that the encryption and decryption of the authentication means by encryption means already present in the transmission system (mobile and base stations) simplify the operations and permit of obtaining the protection sought with little cost. As the case may be, the encryption system CAS is imposed by the standards that control the ETACS networks, and the CAVE system itself is used by the AMPS and CDMA networks.

These and other aspects of the invention will be apparent from and elucidated with reference to the embodiments described hereinafter.

DETAILED DESCRIPTION OF THE PREFERRED EMBODIMENT

Figure 1:
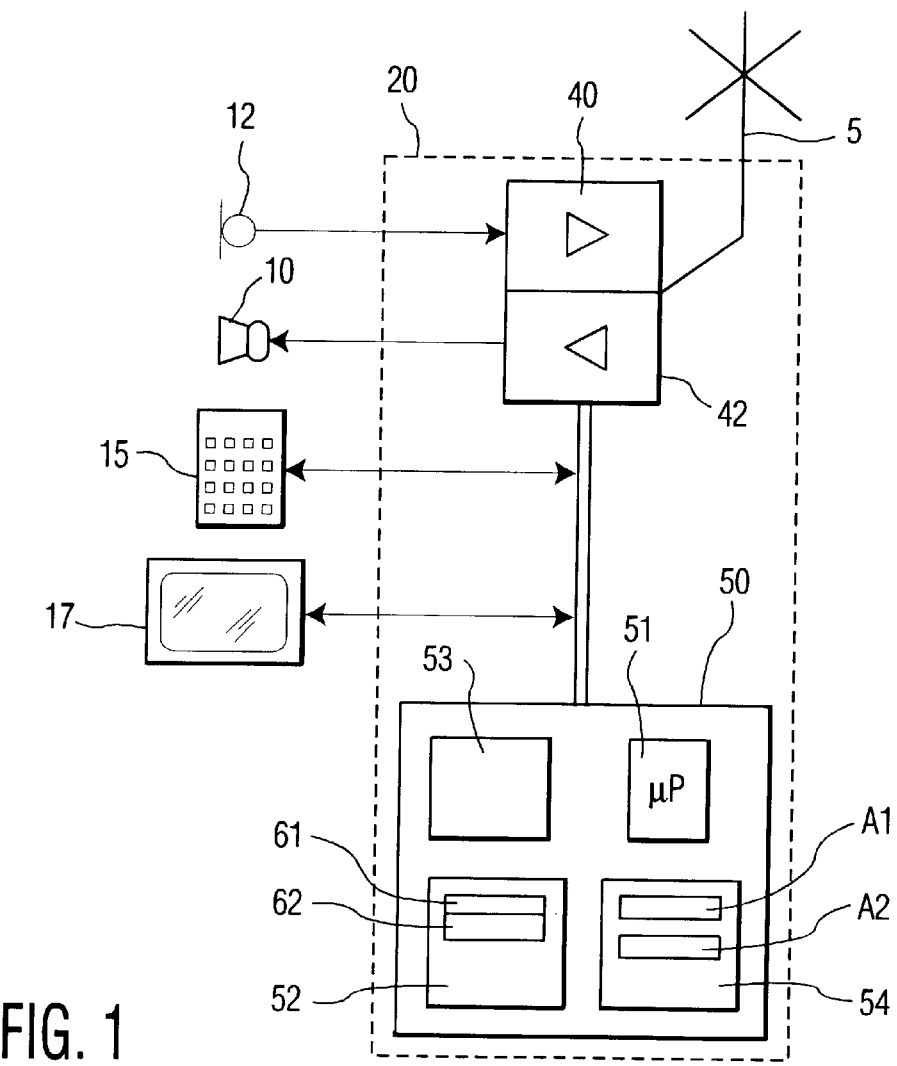
FIG. 1 shows a device according to the invention.

The device shown in FIG. 1 is a mobile radio (mobile station) intended to be connected to a network of the ETACS or AMPS type. It is formed by elements customary for this type of device, that is, an antenna 5, a microphone 12, an earphone 10, a keyboard 15, a screen 17 and an electronic assembly 20. This electronic assembly comprises a transmitter part 40 and a receiver part 42 which permit of the radio traffic by the use of the antenna 5 and thus the exchange of words by the use of the earphone 10 and the microphone 12, without forgetting the signaling exchanges which are implied by the use of the keyboard 15. This whole electronic assembly is governed by a control assembly 50 formed by at least one microcomputer 51 to which are connected, in customary manner, a program memory 52 of the flash memory type, a random-access memory 53 and a programmable read-only memory 54 of the EEPROM type. It is in this memory 54 that various authentication numbers can be stored. In the course of the present description one will particularly be interested in the number designated A-key, which is a key that permits the mobile station to identify itself as being unique among other mobile stations. This key is confidential and must not be known other than by the operator or manufacturer respectively, and possibly by the subscriber, the user of the mobile station. In order to protect oneself against fraudulent manoeuvres such as those described in U.S. Pat. No. 5,392,356, it is suitable to take measures for ensuring the integrity of this number.

According to the invention, for ensuring the integrity of the A-key number, this A-key number is introduced in non-coded form in the mobile station when an entitled person, preferably the operator, utilizes same in the same way as it is introduced in non-coded form in the base station. The program memory 52 contains a program 61 for encrypting at least the A-key and for entering this key, thus encrypted, at a location A1 in the memory EEPROM 54. The algorithm used for the encryption is the CAVE or CAS algorithm depending on the type of respective telephone network, the algorithm already used for encryption purposes for the identification or traffic, as this is imposed by the standards which control the operation of the mobile radio networks AMP and ETACS. The CAVE algorithm is described in the appendix A of EIA/TIA (Electronics Industry Association/Telecommunications Industry Association) Interim Standard IS-54, Revision B and, more particularly, TR45.0.A, Common Cryptographic Algorithms, Revision B, Jun. 21, 1995.

Figure 2:
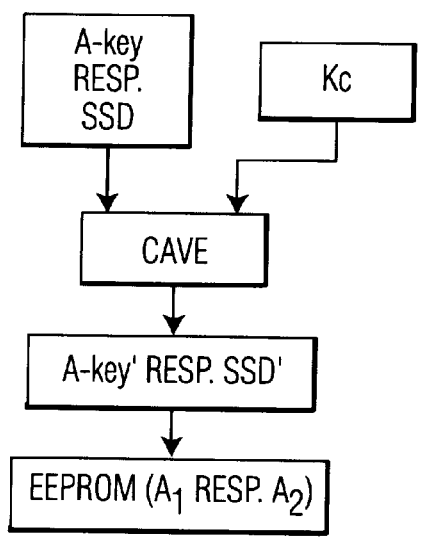
FIG. 2 is an encryption diagram of an authentication number.

The encryption of the A-key is effected as represented in FIG. 2.

The A-key is encrypted via the program 61 by means of a manufacturer's key Kc via the CAVE algorithm. The result, A-key', is then stored at the location A1 of the EEPROM 54 (FIG. 1). The manufacturer's key Kc is secret, as it is not contained in EEPROM 54, but in the program memory 52 which cannot be violated and this manufacturer's key Kc is not transmitted by radio.

Figure 3:
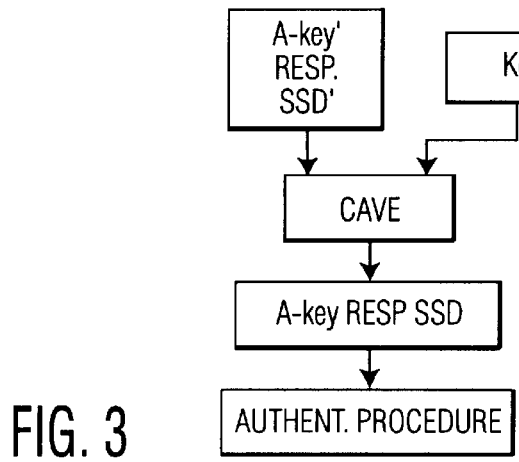
FIG. 3 is a decryption diagram of an authentication number.

When the non-coded A-key is necessary in the mobile station for carrying out an authentication procedure, according to the invention the program memory 52 contains a program 62 which extracts the encrypted A-key' from the EEPROM 54, decrypts it as represented in FIG. 3, still by means of the manufacturer's key Kc and the CAVE algorithm, as represented in FIG. 3, and applies same in decrypted form, A-key, to the mobile station for purposes of identification in an inviolable manner.

Figure 4:
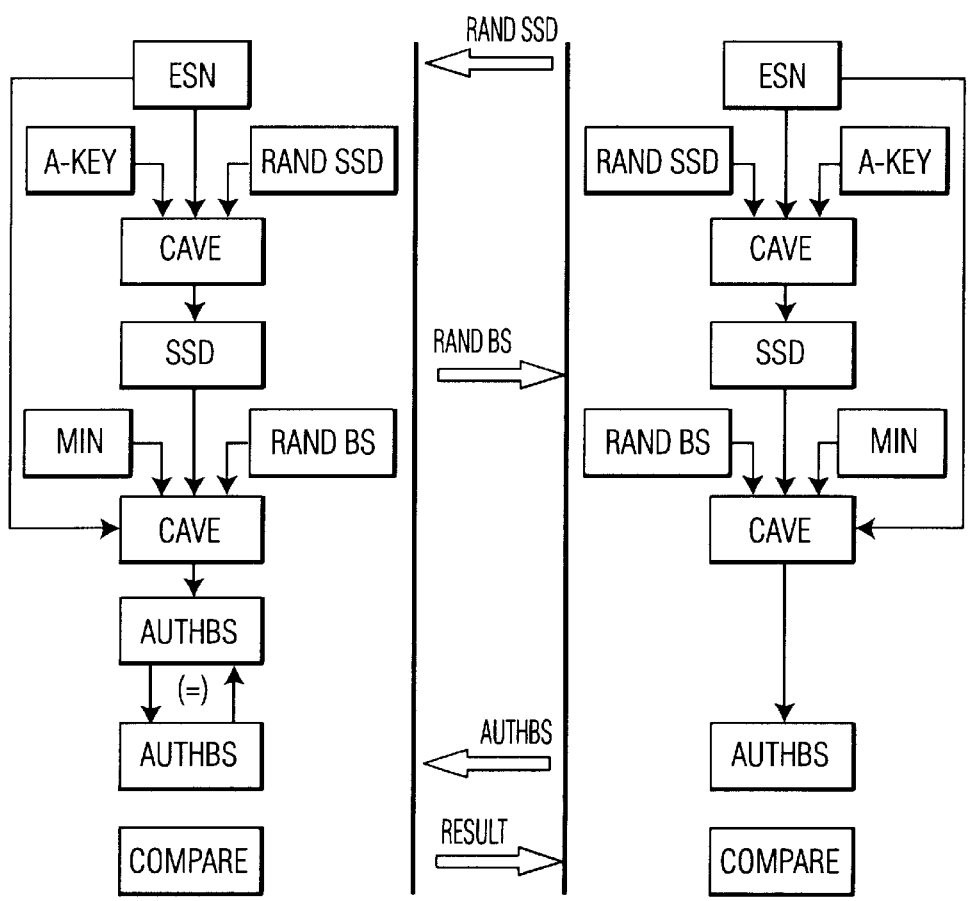
FIG. 4 represents the updating, by encryption based on the A-key, of the authentication number SSD.

It will be noted that the authentication number SSD is used most for authentication procedures. The SSD is itself obtained by encryption on the basis of the A-key and notably the ESN so as to be able to update this SSD through a random number which is also used during this particular encryption, represented in FIG. 4.

The base station (on the right of the Figure) supplies a random number, RANDSSD, by radio to the mobile station (on the left of the Figure). In either one of the two stations, the following same encryption operations are then carried out:

encryption by the CAVE algorithm of the assembly: A-key-ESN-RANDSSD, which results in the authentication key SSD;

supply by radio channel of a random number RANDBS from the mobile station to the base station;

then, for verifying that the two computed numbers of the two stations are identical, encryption by the CAVE algorithm of the assembly: ESN-MIN-SSD-RANDBS, which results in a number AUTHBS;

the numbers AUTHBS are exchanged between the mobile station and the base station and compared, their identity implying also the identity of the numbers SSD.

The number SSD thus obtained is then encrypted by means of the program 62 (FIG. 1) and stored at a location A2 of the memory 54.

Preferably, the program 61 of the program memory 52 is provided for encrypting and feeding to the memory EEPROM 54 all the data it has to contain and, symmetrically, the program 62 is provided for decrypting each of these data before they are supplied to the mobile station on request.

Furthermore, the manufacturer may provide to periodically modify his secret key Kc which allows of effecting the data encryption in the mobile station and in the base station.

What is claimed is:

1. A mobile radio telephone station comprising a protection system for at least one authentication number, and storage means for storing said at least one authentication number, wherein said protection system comprises encryption means for encrypting using a manufacturer key, when the radio telephone mobile station is put into operation, said at least one authentication number shown in a decrypted form, and for storing the at least one authentication number only in its encrypted form in said storage means, and for decrypting said at least one authentication number with said manufacturer key when its decrypted use is needed in the mobile radio telephone station, said manufacturer key not being transmitted by said mobile radio telephone station.

2. The mobile radio telephone station as claimed in claim 1, wherein said at least one authentication number is an authentication key.

3. The mobile radio telephone station as claimed in claim 1, herein a second protected authentication number is a shared secret data.

4. A protection method of protecting an authentication number as claimed in claim 1, wherein said authentication number is encrypted by the mobile radio telephone station, then stored, and decrypted when its decrypted use is needed in the mobile radio telephone station.

5. The mobile radio telephone station as claimed in claim 1, wherein said manufacturer key is part of a program stored in a program memory of said mobile radio telephone station.

6. A wireless telephone comprising:

a data memory;

a program memory which stores a program that includes a manufacturer key; and protection means which encrypts an authentication number of said wireless telephone to form an encrypted number using said manufacturer key, said encrypted number being stored in said data memory, said protection means decrypting said encrypted number using said manufacturer key when said authentication number is needed by said wireless telephone, wherein said manufacturer key is not transmitted by said wireless telephone.

7. The wireless telephone of claim 6, wherein said authentication number is an authentication key.

8. The wireless telephone of claim 6, wherein said data memory stores a second authentication number in an encrypted form.

9. The wireless telephone of claim 6, wherein said second authentication number is a shared secret data.

10. A method of protecting an authentication key of a wireless telephone comprising:

encrypting said authentication key using a manufacturer key included in a program memory stored in a program memory of said wireless telephone to form an encrypted key;

storing said encrypted key in a data memory of said wireless telephone; and decrypting said encrypted key using said manufacturer key to form said authentication key when said authentication number is needed by said wireless telephone; wherein said manufacturer key is not transmitted by said wireless telephone.

11. The method of claim 10 further comprising:

receiving a first random number from a base station; and forming an identification number using an encryption program with said first random number and said authentication number.

12. The method of claim 10 further comprising:

receiving a first random number from a base station;

forming an identification number using an encryption program with said first random number and said authentication number;

forming a first result using said encryption program with a second random number;

transmitting said second random number to said base station to form a second result using said encryption program with said second random number;

transmitting said second result by said base station to said wireless telephone;

comparing said first result to said second result to form a comparison result;

transmitting said comparison result to said base station; and authenticating said wireless telephone by said base station when said comparison result is correct.

* * * * *